S. M. CUMMINGS.

Assignor of part interest to J. WHITE & J. MARQUIS.

Car-Bumper.

No. 8,448. Reissued Oct. 15, 1878.

WITNESSES:

E. A. Hemmenway.

C. H. Dodd.

INVENTOR:

Samuel M. Cummings

BY N. B. Lombard

ATTORNEY.

UNITED STATES PATENT OFFICE.

SAMUEL M. CUMMINGS, OF BOSTON, MASSACHUSETTS, ASSIGNOR OF PART INTEREST TO JOHN WHITE AND JOHN MARQUIS, OF ALLEGHENY, PA.

IMPROVEMENT IN CAR-BUMPERS

Specification forming part of Letters Patent No. 192,570, dated July 3, 1877; Reissue No. 8,418, dated October 15, 1878; application filed June 17, 1878.

*To all whom it may concern:*

Be it known that I, SAMUEL M. CUMMINGS, formerly of Allegheny, Pennsylvania, but now of Boston, in the county of Suffolk and State of Massachusetts, have invented certain new and useful Improvements in Compressible Buffers for Railroad-Cars; and I do hereby declare the following to be a full, clear, and exact description of the invention, such as will enable others skilled in the art to which it pertains to make and use it, reference being had to the accompanying drawings, which form part of this specification.

My invention relates to an improvement in compressible buffers for railroad-cars; and it consists in connecting them by means of an equalizing-bar, rod, lever, or its equivalent, whereby both buffers are kept in continuous contact with those on the preceding or following cars, be it on a curve or a straight track, to maintain an even motion of the cars, as will be more fully described hereinafter.

Figure 1:
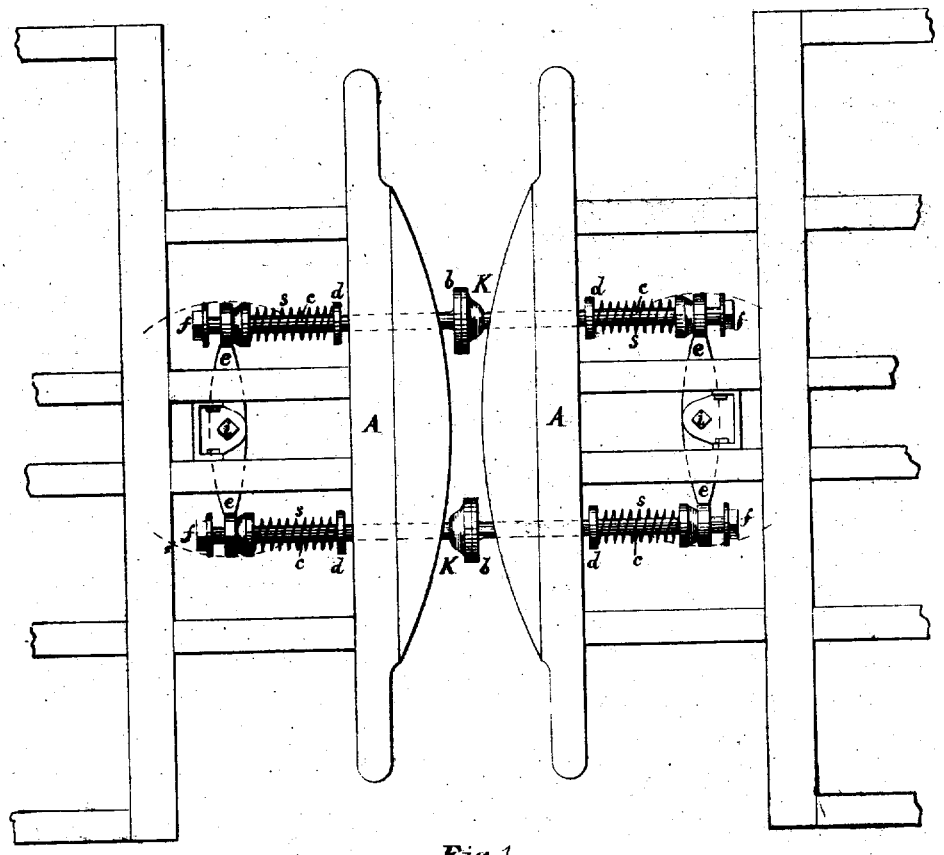
Figure 2:
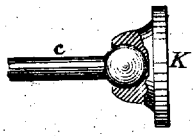

In the accompanying drawings, Figure 1 is a plan view of portions of two cars, illustrating the application of my invention; and Fig. 2 is a detail, illustrating the construction of the movable buffer-head.

A represents the platform of a car, beyond which slightly project two buffers, *b* and K, one of them being placed at each side of the center of the car, at a suitable distance from the coupling between them. The shanks *c* of the buffers extend backward, passing through holes in the ends of the equalizing-lever *e*, and these shanks are surrounded by coiled springs *s*, which press the buffer-heads outward and away from the equalizing-lever *e*. The space between the equalizer and collar *d*, in which the springs are confined, may be suitably adjusted by means of the nuts *f* on the ends of the shanks. The equalizer *e*, connecting the rear ends of the shanks of the buffers, is pivoted in the center at *i*, the pivot being firmly secured to the car, so that any pressure brought against the heads of the buffers will be resisted at this point. One of the buffer-heads is rigid, and moves only horizontally forward and backward with the shank to which it is attached, while the head K, on the second buffer, moves in all directions by means of a ball-joint or some other device equivalent thereto. These heads are distributed in such a manner that each movable head encounters a fixed one on the preceding or following cars.

By the couplings the heads of all the buffers of the train are brought together, and then held in unbroken contact by the pressure of the springs; and as long as the pressure against the buffers remains equal the equalizer remains motionless; but when it becomes greater on one side than on the other, as is the case on a curve, the equalizer will recede where the greater pressure occurs, and advance correspondingly on the opposite side, thus compensating and making the pressure equal on both sides and maintaining an even motion.

The buffers of the above construction are designed not only to prevent an uneven strain upon the cars when in motion, but also to avoid any sudden concussion and consequent jarring, which inevitably occurs at the starting and stopping of trains, or when the velocity of a train is suddenly changed.

Although certain forms of devices have been shown, it is evident that other and equivalent devices may be substituted in their stead without departing from the spirit of my invention, the object of which is to lessen the unequal strain upon the cars, to cause them to run more smoothly, and to prevent the rolling and rocking of the cars when in motion.

I am aware that compressible buffers are used to steady the motion of cars; but, acting independently of each other, the strain becomes unequal on a curve, being greater on the one than the other.

I am also aware that car-couplings have been used in pairs, and have had their rear ends united together by equalizing-rods, and this I broadly disclaim. In my invention the equalizing rod or lever acts in combination with the buffers for an entirely different purpose. It is immaterial what coupling device is used to unite the cars together, as the coupler acts entirely by itself, and without any necessary connection with my buffers.

Having thus described my invention, I claim—

1. In combination with two buffer-heads provided with suitable shanks or rods, and arranged upon opposite sides of the center of the same end of a car, a lever pivoted at its center to the car-frame, or other suitable connection secured thereto, and connected at each end with the rear end of one of said buffer shanks or rods, and a spring applied to each of said buffer-rods between the buffer-head and the pivoted lever, and adapted to act by its tension to force the buffer-head and pivoted lever apart, substantially as and for the purposes described.

2. The combination of the pivoted equalizing-lever *e*, the two rods *c c*, each connected to said lever at opposite ends thereof, and adapted to be moved endwise through the same, the buffer-head *b*, secured in a fixed position on one of the rods *c*, the buffer-head K, secured to the other rod *c* by a ball-and-socket or other universal joint, and the springs *s s*, adapted to act by their tensions to force the buffer-heads and the equalizing-lever apart, substantially as and for the purposes described.

Executed at Boston, Massachusetts, this 13th day of June, A. D. 1878.

SAMUEL M. CUMMINGS.

Witnesses:—
N. C. LOMBARD,
E. A. HEMMENWAY.